US007243017B2

(12) United States Patent

Gehret, Jr.

(10) Patent No.: US 7,243,017 B2

(45) Date of Patent: Jul. 10, 2007

(54) METHOD FOR CONTROLLING INTERNAL COMBUSTION ENGINE EMISSIONS

(75) Inventor: Joseph B. Gehret, Jr., Lynnfield, MA (US)

(73) Assignee: Tecogen, Inc., Waltham, MA (US)

( * ) Notice: Subject to any disclaimer, the term of this patent is extended or adjusted under 35 U.S.C. 154(b) by 0 days.

(21) Appl. No.: 11/449,164

(22) Filed: Jun. 8, 2006

(65) Prior Publication Data

US 2006/0277896 A1 Dec. 14, 2006

Related U.S. Application Data

(60) Provisional application No. 60/689,841, filed on Jun. 13, 2005.

(51) Int. Cl.

*B60T 7/12* (2006.01)
*F02D 41/00* (2006.01)

(52) U.S. Cl. ........................ 701/103; 123/672; 60/285

(58) Field of Classification Search ................ 701/102, 701/103, 104, 109, 114, 115; 123/434, 672, 123/673, 674; 60/285
See application file for complete search history.

(56) References Cited

U.S. PATENT DOCUMENTS

| | | | | |
|---|---|---|---|---|
| 6,102,019 | A * | 8/2000 | Brooks | 123/674 |
| 6,161,531 | A * | 12/2000 | Hamburg et al. | 123/674 |
| 6,308,697 | B1 * | 10/2001 | Surnilla et al. | 123/672 |
| 6,738,707 | B2 * | 5/2004 | Kotwicki et al. | 701/108 |
| 7,059,112 | B2 * | 6/2006 | Bidner et al. | 60/277 |
| 7,194,854 | B2 * | 3/2007 | Surnilla et al. | 60/285 |
| 2003/0093212 | A1 * | 5/2003 | Kotwicki et al. | 701/102 |

* cited by examiner

*Primary Examiner*—John T. Kwon
(74) *Attorney, Agent, or Firm*—Pandiscio & Pandiscio; Scott R. Foster

(57) ABSTRACT

A method for controlling internal combustion engine emissions, including the steps of reading signals from sensors in an engine exhaust manifold and catalytic converter exhaust, an upstream one of the sensors being provided with an air-fuel mixture setpoint, comparing signal values with previous average values and automatically adjusting the air-fuel mixture set point to vary the fuel mixture fed to the engine.

8 Claims, 1 Drawing Sheet

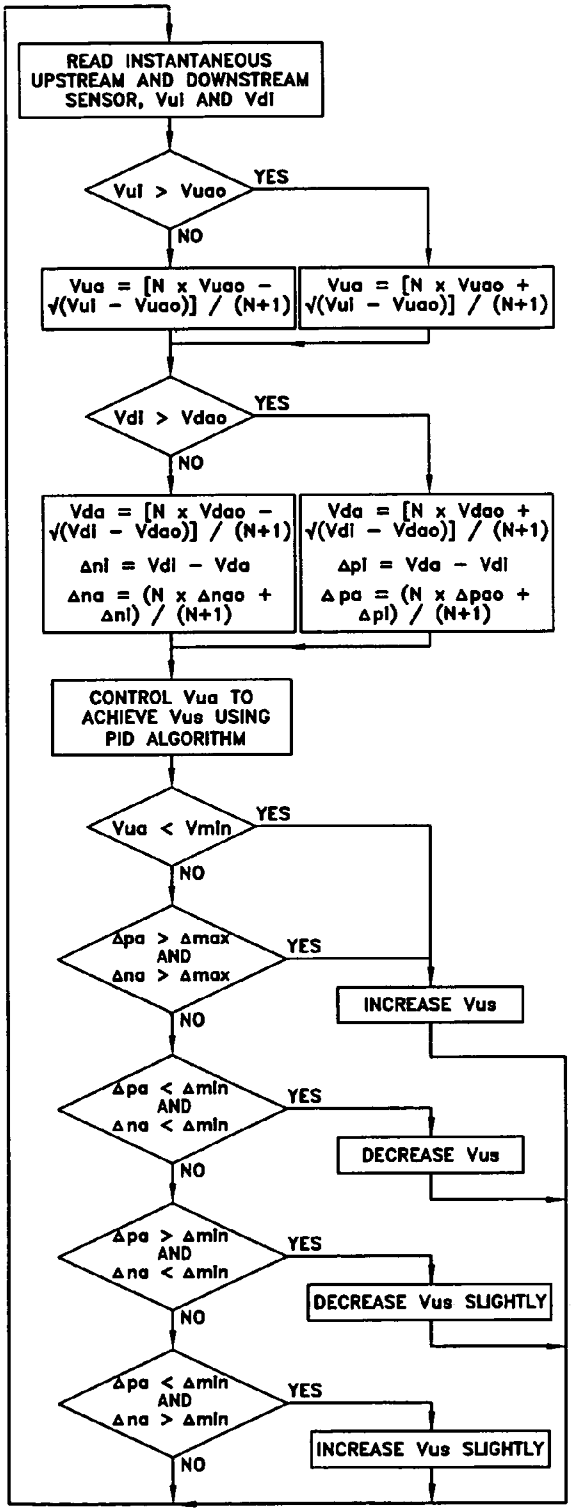

KEY

| | |
|---|---|
| Vdi | INSTANTANEOUS DOWNSTREAM SENSOR SIGNAL |
| Vui | INSTANAEOUS UPSTREAM SENSOR SIGNAL |
| Vda | AVERAGE DOWNSTREAM SENSOR SIGNALS |
| Vua | AVERAGE UPSTREAM SENSOR SIGNALS |
| Vdao | PREVIOUS AVERAGE Vda |
| Vuao | PREVIOUS AVERAGE Vua |
| Δni | INSTANTANEOUS NEGATIVE DEVIATION |
| Δpi | INSTANTANEOUS POSITIVE DEVIATION |
| Δna | AVERAGE NEGATIVE DEVIATION |
| Δpa | AVERAGE POSITIVE DEVIATION |
| Δnao | PREVIOUS AVERAGE DEVIATION |
| Δpao | PREVIOUS AVERAGE DEVIATION |
| Vus | UPSTREAM SENSOR SETPOINT |
| Vmin | MINIMUM DOWNSTREAM SENSOR SIGNAL |
| Δmax | MAXIMUM DEVIATION |
| Δmin | MINIMUM DEVIATION |

FIG. 1

METHOD FOR CONTROLLING INTERNAL COMBUSTION ENGINE EMISSIONS

CROSS-REFERENCE TO RELATED APPLICATION

This application claims the benefit of U.S. Provisional Patent Application Ser. No. 60/689,841, filed Jun. 13, 2005, in the name of Joseph B. Gehret, Jr.

BACKGROUND OF THE INVENTION

1. Field of the Invention

The invention relates to the control of fuel mixtures for internal combustion engines to mitigate exhaust pollutants.

2. Description of the Prior Art

The use of oxygen sensors to control internal combustion engine fuel mixtures to exact stoichiometry is known. The control is necessary for catalysts, used to mitigate exhaust pollutants, to operate properly on the engines.

The control of a fuel mixture relies upon such oxygen sensors positioned before and/or after a catalyst used to mitigate the exhaust pollutants. The sensor or sensors provide signals to a fuel control system which varies the fuel mixture to achieve the best possible emission levels.

In a known single-sensor system, the sensor is placed before the catalyst (hereinafter termed "upstream" sensor) and its signal is fed back to a fuel control system which then varies the fuel mixture to achieve the best possible emission levels. Unfortunately, the sensors are subject to drift due to aging, environmental conditions, and engine operating parameters and conditions.

To correct for such problems, it is known to place a second oxygen sensor downstream of the catalyst (hereinafter termed "downstream" sensor). The downstream sensor is used to provide further control and correct any drift in the upstream sensor. However, the downstream sensor often sends momentary extreme signals to the upstream sensor, based upon a fuel anomaly in the content of exhaust gases. Such extreme signals cause a marked shift in the upstream controls which, in turn cause a further anomaly downstream There is thus a need for a method for signal conditioning and reaction which may be used to perform controlling and corrective actions without momentarily extreme changes in operation of the catalyst.

SUMMARY OF THE INVENTION

An object of the invention is, therefore, to provide an improved method, utilizing such sensors, for controlling internal combustion engine emissions.

With the above and other objects in view, as will hereinafter appear, a feature of the present invention is the provision of a method for controlling internal combustion engine emissions in a system including a fuel control device, an internal combustion engine adapted to receive fuel from the fuel control device and having an exhaust manifold, a first sensor in communication with the engine exhaust manifold for monitoring exhaust gases exiting therefrom and adapted to send a signal to the fuel control device to cause the fuel control device to vary a fuel mixture to achieve improved emission levels, a catalytic converter in communication with the first sensor and adapted to receive exhaust gases from the exhaust manifold and to oxidize carbon monoxide and hydrocarbon pollutants, and a second sensor in communication with the catalytic converter and adapted to monitor the exhaust gases exiting therefrom, the second sensor being adapted to sense oxygen in the exhaust gases and to send a second signal to the fuel control device, the method comprising the steps of obtaining and reading instantaneous signals from each of the sensors at selected millisecond intervals to obtain an instantaneous average value, subtracting the instantaneous average value from a previous average value to obtain a difference therebetween, determining the square root of the difference, selectively undertaking one of (1) adding the square root to the previous average value if the instantaneous value exceeds the previous average value, and (2) subtracting the square root from the previous average value if the instantaneous value is less than the previous average value, to obtain a resultant value, multiplying the previous average value by a selected integer (N) and adding the resultant value to obtain a result and dividing the result by the selected positive integer plus one (N+1) to obtain a new average value, obtaining one of a positive deviation value and a negative deviation value from the second sensor signal, selectively undertaking one of (1) when the instantaneous average value exceeds the previous average value, adding the positive deviation to N times the previous positive deviation to obtain a sum and dividing by (N+1) to compute a new positive deviation, and (2) when the instantaneous value is less than the previous average value, adding the negative deviation to N times the previous negative deviation to obtain a sum and dividing by (N+1) to compute a new negative deviation, providing the first sensor with a desired air-fuel mixture setpoint, and using the new positive and negative deviations of the second sensor and a converter outlet temperature to tune the setpoint of the first sensor so as to vary the fuel mixture fed to the engine. As a consequence of the steps hereinabove, the setpoint of the first sensor is driven richer or leaner so as to vary the fuel mixture fed to the engine.

The above and other features of the invention will now be more particularly described with reference to the accompanying drawing and pointed out in the claims. It will be understood that the particular method embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawing in which is shown an illustrative flow chart featuring the steps of the inventive method, from which the novel features and advantages of the invention will be apparent.

FIG. 1 is a flow chart of one form of method illustrative of an embodiment of the invention.

DESCRIPTION OF THE PREFERRED EMBODIMENT

Instantaneous signals Vdi, Vui, from downstream and upstream sensors are conditioned in the same manner. Each instantaneous signal is read at selected intervals, preferably every 300-340 milliseconds, and preferably at intervals of about 320 milliseconds. An average value Vda, Vua is computed based upon a selected number of instantaneous signals and is subtracted from a previous average of the signals Vdao, Vuao to obtain an absolute value of a difference. The square root of the absolute value of the difference is added to the previous average value if the instantaneous value read Vdi, Vui is greater than the previous average value Vdao, Vuao and is subtracted from the previous average value if the instantaneous value read is less than the previous average value. A resultant value is then rolled into the average value Vda, Vua by multiplying the previous average value by a selected positive integer N, as for example, 31, adding the new instantaneous value Δni, Δpi, and dividing the result by N+1 as, for example, 32, causing an exponential approach to a new average value.

Two additional values, an instantaneous positive deviation Δpi and an instantaneous negative deviation Δni, are derived from the average downstream sensor signal Vda. Whenever the average instantaneous sensor value Vda, Vua is greater than the previous average deviation value Δpao, Δnao, the deviation Δpi is added to 31 times the previous positive deviation and the sum is divided by 32 to compute a new positive deviation Δpa. The negative deviation Δna is computed in the same fashion.

A standard proportional integral derivative (PID) algorithm (a set of rules with which precise regulation of a closed-loop control system is obtained) is used with the averaged signal of the upstream sensor to control the engine fueling. The average signal value Vda of the downstream sensor and both positive and negative deviations Δpi, Δni of the downstream sensor are used to tune a setpoint (desired value) Vus of the upstream sensor.

When the new average downstream sensor signal is less than a predetermined value Vmin dependent on the catalyst outlet temperature, the setpoint Vus of the upstream sensor is driven richer. Similarly, if both the positive and negative deviations Δpa, Δni are greater than a predetermined value Δmax dependent on the catalyst outlet temperature, the setpoint Vus of the upstream sensor is again driven richer.

If both positive and negative deviations Δpa, Δna are less than a predetermined value Δmin dependent on the catalyst outlet temperature, the setpoint Vus of the upstream sensor is driven leaner. If the positive deviation Δpa is greater than a predetermined value dependent on the catalyst outlet temperature but the negative deviation Δna is not, the setpoint Vus of the upstream sensor is driven slightly leaner.

Finally, if the negative deviation Δna is greater than a predetermined value dependent on the catalyst outlet temperature, but the positive deviation Δpa is not, the setpoint Vus of the upstream sensor is driven slightly richer.

This method has been shown to control the fuel mixture in a manner which maintains good tailpipe emission over time without manual calibration.

There is thus provided a method for sensor signal conditioning and reaction which is effective in controlling engine emission and initiating and effecting corrective action.

It is to be understood that the present invention is by no means limited to the particular method steps herein disclosed and/or shown in the drawings, but also comprises any modification or equivalent within the scope of the claims.

What is claimed is:

1. A method for controlling internal combustion engine emissions in a system comprising a fuel control device, an internal combustion engine adapted to receive fuel from the fuel control device and having an exhaust manifold, a first sensor in communication with the engine exhaust manifold for monitoring exhaust gases exiting therefrom and adapted to send a signal to the fuel control device to cause the fuel control device to vary a fuel mixture to achieve improved emission levels, a catalytic converter in communication with the first sensor and adapted to receive exhaust gases from the engine exhaust manifold and to oxidize carbon monoxide and hydrocarbon pollutants, and a second sensor in communication with the catalytic converter and adapted to monitor the exhaust gases exiting therefrom, the second sensor being adapted to sense oxygen in the exhaust gases and to send a second signal to the fuel control device, the method comprising the steps of:

obtaining and reading instantaneous signals from each of the sensors at selected millisecond intervals to obtain an instantaneous average value of a selected number of signals;

subtracting the instantaneous average value from a previous average value to obtain a difference therebetween;

determining a square root of the difference;

selectively undertaking one of (1) adding the square root to the previous average value if the instantaneous value exceeds the previous average value, and (2) subtracting the square root from the previous average value if the instantaneous value is less than the previous average value, to obtain a resultant value;

multiplying the previous average value by a selected positive integer (N) and adding the resultant value to obtain a result and dividing the result by the selected positive integer plus one (N+1) to obtain a new average value;

obtaining one of a positive deviation value and a negative deviation value from the second sensor signal;

selectively undertaking one of (1) when the instantaneous average value exceeds the previous average value, adding the positive deviation to N times the previous positive deviation to obtain a first sum and dividing the first sum by N+1 to compute a new positive deviation, and (2) when the instantaneous value is less than the previous average value, adding the negative deviation to N times the previous negative deviation to obtain a second sum and dividing the second sum by N+1 to compute a new negative deviation;

providing the first sensor with a desired air-fuel mixture setpoint; and using the new positive and negative deviations of the second sensor and a converter outlet temperature to tune the setpoint of the first sensor so as to vary the fuel mixture fed to the engine.

2. The method in accordance with claim 1 wherein the setpoint of the first sensor is driven richer or leaner so as to vary the fuel mixture fed to the engine.

3. The method in accordance with claim 2 wherein obtaining and reading instantaneous signals is carried out at selected millisecond intervals.

4. The method in accordance with claim 1 wherein N comprises an integer selected from a group of integers comprised of 1-99.

5. The method in accordance with claim 4 wherein N comprises an integer selected from a group of integers comprised of 25-45.

6. The method in accordance with claim 5 wherein N equals about 31.

7. The method in accordance with claim 3 wherein the selected instantaneous intervals are about 300-340 milliseconds.

8. The method in accordance with claim 7 wherein the intervals are about 320 milliseconds.

* * * * *